(12) United States Patent
Tran et al.

(10) Patent No.: US 7,533,311 B2
(45) Date of Patent: May 12, 2009

(54) PROGRAMMABLE MANAGEMENT IO PADS FOR AN INTEGRATED CIRCUIT

(75) Inventors: Hoang T. Tran, San Diego, CA (US); Howard A. Baumer, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 1105 days.

(21) Appl. No.: 10/694,730

(22) Filed: Oct. 29, 2003

(65) Prior Publication Data

US 2004/0117698 A1 Jun. 17, 2004

Related U.S. Application Data

(60) Provisional application No. 60/421,780, filed on Oct. 29, 2002.

(51) Int. Cl.
*G01R 31/28* (2006.01)
(52) U.S. Cl. .................... 714/724; 710/71; 710/305; 710/31; 710/62; 370/366; 370/419; 370/466
(58) Field of Classification Search ................ None
See application file for complete search history.

(56) References Cited

U.S. PATENT DOCUMENTS

| | | | |
|---|---|---|---|
| 4,627,070 A | 12/1986 | Champlin et al. | |
| 4,833,605 A | 5/1989 | Terada et al. | |
| 4,833,695 A | 5/1989 | Greub | |
| 4,967,201 A | 10/1990 | Rich, III | |
| 5,660,568 A * | 8/1997 | Moshayedi | 439/654 |
| 5,726,991 A | 3/1998 | Chen et al. | |
| 5,793,990 A | 8/1998 | Jirgal et al. | |
| 5,803,757 A * | 9/1998 | Wang | 439/188 |
| 5,933,021 A | 8/1999 | Mohd | |
| 5,999,021 A * | 12/1999 | Jang | 327/97 |
| 6,081,570 A | 6/2000 | Ghuman et al. | |
| 6,087,851 A * | 7/2000 | Kim et al. | 326/63 |
| 6,137,734 A | 10/2000 | Schoner et al. | |

(Continued)

OTHER PUBLICATIONS

The institue of Electrical and Electronics Engineering, Inc (IEEE); IEEE 100 The Authoritative Dictionary of IEEEd standards terms, Dec. 2000; Standards Information Network IEEE Press; Seventh Edition; p. 1196.*

(Continued)

*Primary Examiner*—John P Trimmings
*Assistant Examiner*—Steven D Radosevich
(74) *Attorney, Agent, or Firm*—Sterne Kessler Goldstein & Fox P.L.L.C.

(57) ABSTRACT

A multi-port SERDES transceiver includes multiple parallel and serial ports, and the flexibility to connect any one of the parallel or serial ports to another parallel or serial port. The ports include programmable pads that are capable of supporting multiple different data protocols, timing protocols, electrical specifications, and input-output functions. A management data IO pad also enables the transceiver to support different electrical requirements and data protocols at the same time. The substrate layout of the transceiver is configured so that the parallel ports and the serial ports are on the outer perimeter. A logic core is at the center, where the logic core operates the serial and parallel data ports, and the bus that connects the data ports. The bus can be described as a "ring" structure (or donut "structure") around the logic core, and is configured between the logic core and the data ports.

15 Claims, 14 Drawing Sheets

U.S. PATENT DOCUMENTS

| | | | |
|---|---|---|---|
| 6,140,956 A | 10/2000 | Hillman et al. | |
| 6,172,524 B1* | 1/2001 | Cho | 326/70 |
| 6,175,556 B1* | 1/2001 | Allen et al. | 370/293 |
| 6,183,307 B1* | 2/2001 | Laity et al. | 439/676 |
| 6,259,693 B1 | 7/2001 | Ganmukhi et al. | |
| 6,317,804 B1 | 11/2001 | Levy et al. | |
| 6,346,827 B1* | 2/2002 | Yeung et al. | 326/41 |
| 6,434,157 B1* | 8/2002 | Dube' et al. | 370/401 |
| 6,438,717 B1 | 8/2002 | Butler et al. | |
| 6,483,849 B1 | 11/2002 | Bray et al. | |
| 6,516,352 B1* | 2/2003 | Booth et al. | 709/250 |
| 6,760,781 B1* | 7/2004 | Wang et al. | 709/250 |
| 6,789,144 B1* | 9/2004 | Lai et al. | 710/57 |
| 6,859,825 B1* | 2/2005 | Williams | 709/220 |
| 6,880,078 B2* | 4/2005 | Rabinovich | 713/100 |
| 7,032,139 B1 | 4/2006 | Iryami et al. | |
| 7,035,228 B2 | 4/2006 | Baumer | |
| 7,080,162 B2* | 7/2006 | Conley et al. | 709/250 |
| 7,133,416 B1* | 11/2006 | Chamdani et al. | 370/466 |
| 2001/0000161 A1* | 4/2001 | Laity | 439/676 |
| 2001/0009553 A1* | 7/2001 | Homann | 370/445 |
| 2001/0012288 A1 | 8/2001 | Yu | |
| 2001/0015664 A1 | 8/2001 | Taniguchi | |
| 2001/0017595 A1 | 8/2001 | Cliff et al. | |
| 2001/0021953 A1 | 9/2001 | Nakashima | |
| 2001/0043603 A1* | 11/2001 | Yu | 370/393 |
| 2002/0019173 A1* | 2/2002 | Oliphant et al. | 439/676 |
| 2002/0054569 A1 | 5/2002 | Morkawa | |
| 2002/0157030 A1* | 10/2002 | Barker et al. | 713/320 |
| 2002/0165924 A1* | 11/2002 | Kim et al. | 709/209 |
| 2003/0009307 A1 | 1/2003 | Mejia et al. | |
| 2003/0048781 A1 | 3/2003 | Peirson | |
| 2003/0120791 A1 | 6/2003 | Weber et al. | |
| 2003/0172332 A1 | 9/2003 | Rearick et al. | |
| 2004/0068593 A1* | 4/2004 | Helenic et al. | 710/71 |
| 2004/0083077 A1 | 4/2004 | Baumer et al. | |
| 2004/0088443 A1 | 5/2004 | Tran et al. | |
| 2004/0141497 A1 | 7/2004 | Amirichimeh et al. | |
| 2004/0141531 A1 | 7/2004 | Amirichimeh et al. | |
| 2005/0190690 A1 | 9/2005 | Tran | |
| 2006/0250985 A1 | 11/2006 | Baumer | |

OTHER PUBLICATIONS

EtherLink III ISA Network Interface Card User Guide; Jan. 1998; pp. 1-110.*

IEEE Std. 802.3, Part 3: Carrier Sense Multiple Access with Collision Detection (CSMA/CD) access method and physical layer specifications, Section Two, pp. 9-55, Copyright 2002.

IEEE Std. 802.3: Carrier Sense Multiple Access with Collision Detection (CSMA/CD) access method and physical layer specifications, Section Four, pp. 9-152, Copyright 2005.

Cisco Systems, Hiroshi Suzuki: Taking Ethernet Beyond the LAN, http://newsroom.cisco.com/dlls/innovators/optical/hiroshi_suzuki_profile.html.

Cisco Systems, Q&A: Hiroshi Suzuki on Extending Ethernet Beyond the LAN, http://newsroom.cisco.com/dlls/innovators/optical/hiroshi_suzuki_qa.html.

Cisco Systems, Innovators Profiles, http://newsroom.cisco.com/dlls/innovators/inn_profiles.html.

Cisco Systems, Optical, http://newsroom.cisco.com/dlls/innovatros/optical/.

Cisco Systems, Cisco Systems ad Aretae Interactive Launch Internet Powered Property (IP2), http://newroom.cisco.com/dlls/global/asiapac/news/2000/pr_07-25.html.

International Search Report Issued Dec. 14, 2004 for International Application No. PCT/US03/34234, 5 pages.

Alaska Quad-Port Gigabit Ethernet Over Copper Transceivers, from http://www.marvell.com/products/transceivers/quadport/..., 1 page, printed May 8, 2007.

Alaska X10 Gigabit Ethernet Alaska Gigabit Ethernet Fast Ethernet Physical Layer (PHY) Transceiver Families Provide a Full Range of Ethernet Transceiver Solutions for the Broadband Communications Industry, from http://www.nuhorizons.com/FeaturedProducts/Volume3/Marvell/phy_transceiver.asp, 4 pages, Copyright 2007, printed May 8, 2007.

Cisco Search: Results for "cdl" within "News@Cisco", from http://www.cisco.com/pcgi-bin/search/search.pl, Copyright 1992-2003, printed Jul. 29, 2003.

Industry Breakthrough: Marvell Announces the First Quad-Port Transceiver to Support Both Copper and Fiber-Optic Gigabit Ethernet Interfaces, from Business Wire at www.encyclopedia.com/printable/aspx?id=1G1:68912211, 4 pages, Jan. 9, 2001, printed May 8, 2007.

David Maliniak (ed.), Bel's integrated connector modules support Marvell's Alaska quad Gigabit Ethernet transceiver, from http://www.electronicsweb.com/Content/news/..., 1 page, Dec. 14, 2000, printed May 8, 2007.

Marvell Gets Small, from http://www.lightreading.com/document.asp?doc_id=12004&print=true, 1 page, Feb. 19, 2002, printed May 8, 2007.

Marvell Introduces the Industry's Smallest Quad-Port Gigabit Transceiver Device, Enabling Ultra High Port Density Enterprise Switching Systems, from http://www.marvell.com/press/pressNewsDisplay.do?releaseID-41, 3 pages, Feb. 19, 2002, printed May 8, 2007.

Ed Turner, David Law, Sep. 17-19, 2001, "IEEE P802.3ae MDC/MDIO", http://www.leee802.org/3/efm/public/sep01/turner.sub.—1.sub.—0901.pdf.

Q&A: Hiroshi Suzuki on Extending Ethernet Beyond the LAN, from http://newsroom.cisco.com/dlls/innovators/optical/hiroshi_suzuki_qa.html, 3 pages, Copyright 1992-2003, printed Jul. 29, 2003.

"Broadcom Announces the First 0.13-micron CMOS Multi-Rate Gigabit Octal Serializers/Deserializers" [online], Broadcom Press Release, Oct. 29, 2002 [retrieved on Jul. 16, 2003]. Retrieved from the Internet: <URL: http://www.broadcom.com/cgi-bin/pr/prps.cgi?pr_id=PR021029> (5 pages).

"BCM8040 8-Channel Multi-rate 1.0-3.2-GBPS Retimer Switch" [online], Broadcom Products Site Guide [retrieved on Jul. 16, 2003]. Retrieved from the Internet: <URL: http://www.broadcom.com/products/8040.html> (2 pages).

"8-Channel Multi-Rate CMOS Retimer with Full Redundancy" [online], BCM8040 Product Brief, Broadcom Corporation (2002) [retrieved on Jul. 16, 2003]. Retrieved from the Internet: <URL: http://www.broadcom.com/products/8040.html> (2 pages).

"BCM8020 8-Channel Multi-rate 1.0-3.2-GBPS Transceiver" [online], Broadcom Products Site Guide [retrieved on Jul. 16, 2003]. Retrieved from the Internet: <URL: http://www.broadcom.com/products/8020.html> (2 pages).

"8-Channel Multi-Rate CMOS Transceiver with Full Redundancy" [online], BCM8020 Product Brief, Broadcom Corporation (2002) [retrieved on Jul. 16, 2003]. Retrieved from the Internet: <URL: http://www.broadcom.com/products/8020.html> (2 pages).

"BCM8021 4-Channel Multi-rate 1.0-3.2-GBPS Transceiver with High-Speed Redundancy" [online], Broadcom Products Site Guide [retrieved on Jul. 16, 2003]. Retrieved from the Internet: <URL: http://www.broadcom.com/products/8021.html> (2 pages).

"4-Channel Multirate 1.0-3.2-GBPS Transceiver with High-Speed Redundancy" [online], BCM8021 Product Brief, Broadcom Corporation (2002) [retrieved on Jul. 16, 2003]. Retrieved from the Internet: <URL: http://www.broadcom.com/products/8021.html> (2 pages).

"Broadcom Announces the Industry's First 0.13-micron CMOS Advanced Transciver Solution with Signal Conditioning for Low-Cost 10-Gigabit Over Copper Links" [online], Broadcom Press Release, Apr. 29, 2003 [retrieved on Jul. 16, 2003]. Retrieved from the Internet: <URL: http://www.broadcom.com/cgi-bin/pr/prps.cgi?pr_id=PR030429A> (4 pages).

* cited by examiner

PROGRAMMABLE MANAGEMENT IO PADS FOR AN INTEGRATED CIRCUIT

CROSS-REFERENCE TO RELATED APPLICATIONS

This application claims the benefit of U.S. Provisional Application No. 60/421,780, filed Oct. 29, 2002, entitled "Multi-Rate, Multi-Port, Gigabit Serdes Transceiver," incorporated herein by reference in its entirety.

BACKGROUND OF THE INVENTION

1. Field of the Invention

The present invention generally relates to serializer/deserializer integrated circuits with multiple high-speed data ports, and more particularly to a serializer and deserializer chip that includes the functionality to switch between multiple high-speed data ports.

2. Related Art

High-speed data links transmit data from one location to another over transmission lines. These data links can include serializer data links (i.e., SERDES) that receive data in a parallel format and convert the data to a serial format for high-speed transmission, and deserializer data links (i.e., SERDES) that receive data in a serial format and convert the data to a parallel format. SERDES data links can be used for communicating data through a backplane in a communications system (e.g., Tyco Backplane 16 or 30-inch trace).

In a high-speed back plane configuration, it is often desirable to switch between multiple SERDES links. In other words, it is often desirable to switch between any one of multiple SERDES links to another SERDES link, and to do so in a low power configuration on a single integrated circuit.

SUMMARY OF THE INVENTION

A multi-port SERDES transceiver includes multiple parallel ports and serial ports, and includes the flexibility to connect any one of the parallel ports to another parallel port or to a serial port, or both. Furthermore, the multi-port transceiver chip can connect any one of the serial ports to another serial port or to one of the parallel ports. Each parallel port and each serial port includes a plurality of input-output (IO) pads. According to embodiments of the present invention, the pads are programmable to support multiple different electrical specifications, data protocols, timing protocols, input-output functions, and the like.

The IO pads for the parallel ports are programmable to support different data protocols, including, but not limited to, the XGMII protocol, the Ten Bit Interface (TBI) protocol, the Reduced TBI (RTBI) protocol, and the like. The IO pads are also programmable to support different electrical specifications, including, but not limited to, the High Speed Transistor Logic (HSTL) electrical specification, the Solid State Track Link (SSTL) electrical specification, the Low Voltage Transistor—Transistor Logic (LVTTL) specification, and the like.

The multi-port transceiver of the present invention is also programmable to support multiple electrical specifications. The transceiver includes a plurality of management data input/output (MDIO) pads. Each MDIO pad is programmable to configure itself and its associated IO pads to comply with the appropriate electrical requirements and data protocols. The electrical specifications and data protocols include IEEE 802.3™ clause 45, IEEE 802.3™ clause 22, or the like.

Depending on the specified electrical specification and the specified data protocol, the transceiver may be required to support different electrical requirements at the MDIO pad and the adjacent IO pads. Therefore, the MDIO pad is configured to have a separate power connection from the power connection to associated IO pads. In an embodiment, a split-voltage bus structure is provided to connect the pads for the transceiver to a bus. The structure breaks the power bus VDDO I/O supply, which allows the MDIO pads and the IO pads to operate at different voltage at a given time.

The multi-port SERDES transceiver also includes a packet bit error rate tester (BERT). The packet BERT generates and processes packet test data that can be transmitted over any of the serial ports to perform bit error testing. The packet BERT can monitor (or "snoop") between the serial ports. In other words, if data is being transmitted from one serial port to another serial port, the packet BERT can capture and store a portion of this data for bit error testing.

The substrate layout of the multi-port SERDES transceiver chip is configured so that the parallel ports and the serial ports are on the outer perimeter of the substrate. A logic core is at the center of the substrate, where the logic core operates the serial and parallel data ports, and a bus that connects the data ports. The bus can be described as a "ring" structure (or donut "structure") around the logic core, and is configured between the logic core and the data ports. The ring structure of the bus provides efficient communication between the logic core and the various data ports.

Further features and advantages of the present invention, as well as the structure and operation of various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art(s) to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

Figure 1:
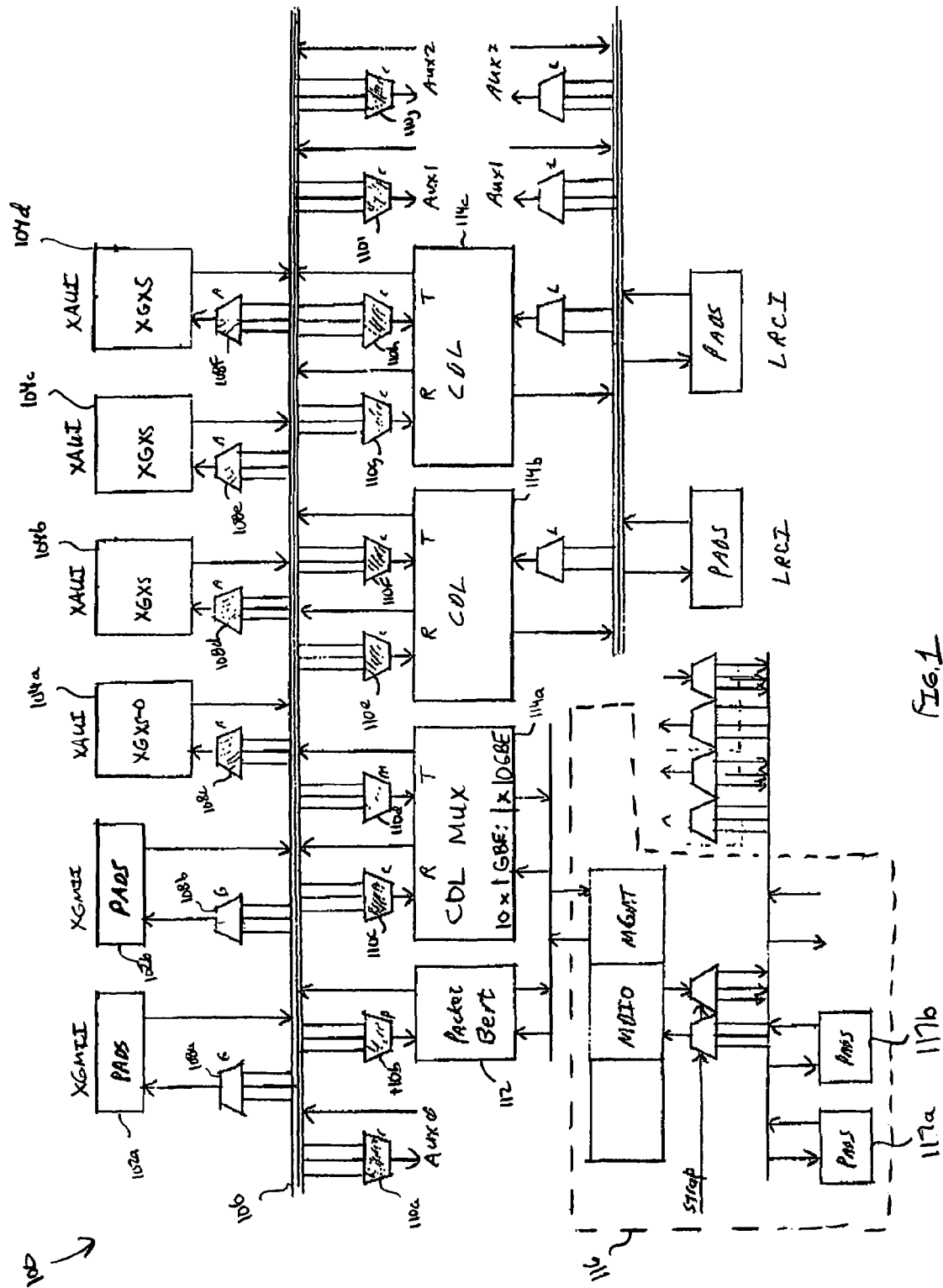
FIG. 1 illustrates a multi-port SERDES transceiver chip according to an embodiment of the present invention.

FIG. 1 illustrates a multi-port SERDES transceiver 100 according to embodiments of the present invention. The SERDES transceiver 100 includes multiple parallel ports and serial ports, and includes the flexibility to connect any one of the parallel ports to another parallel port or to a serial port, or both. Furthermore, the multi-port transceiver chip 100 can connect any one of the serial ports to another serial port or to one of the parallel ports.

More specifically, the SERDES transceiver chip 100 includes two parallel transceiver ports 102a-102b and four serial transceiver ports 104a-104d. Other configurations having a different number of ports could be used. The parallel transceiver ports 102a-102b transmit and receive data in a parallel format. The parallel transceiver ports 102a-102b can be XGMII parallel ports, for example, where the XGMII transceiver protocol is known to those skilled in the relevant art(s). Each XGMII port 102 can includes 72 pins, for example, operating at 1/10 the data rate of the serial ports 104.

The four serial ports 104a-d can be XAUI serial ports, and transmit and receive data in a serial format. Each serial port 104 can be a quad serial port having four serial data lines using the XAUI protocol that is known to those skilled in the relevant art(s). In embodiments of the invention, the serial ports 104 can operate at data rates of 3.125 GHz, 2.5 GHz, and 1.25 GHz. In other words, transceiver chip 100 is a multi-rate device. However, the XAUI data rates above are effectively quadrupled since there are four serial data lines in each serial port 104. The serial ports 104 can be further described as a 10-Gigabit extension sub-layer (XGXS). In embodiments, the serial data ports 104 are differential.

The parallel ports 102 and the serial ports 104 are linked together by a bus 106. The bus 106 enables data to travel between all the ports 102 and 104. More specifically, the bus 106 enables data to travel from one parallel port 102 to another parallel port 102, and to travel from one parallel port 102 to a serial port 104. Multiplexes 108 connect the bus 106 to the parallel ports 102 and to the serial ports 104. The serial port 104 performs a parallel to serial conversion when receiving parallel data that is to be sent out serial. Likewise, the bus 106 enables data to travel from one serial port 104 to another serial port 104, and to travel between a serial port 104 and a parallel port 102. The parallel port 102 performs a serial-to-parallel conversion when receiving serial data that is to be sent out in parallel. The multi-port SERDES transceiver 100 is highly flexible in being able to connect multiple parallel ports 102 to multiple serial ports 104, and vice versa.

In embodiments, the SERDES transceiver chip 100 can be implemented on a single CMOS substrate. For example, the SERDES transceiver chip 100 can be implemented using a low power 0.13-micron CMOS process technology, which lends itself to higher levels of integration and application.

The transceiver 100 enables dual unit operation, where one parallel port 102 is paired up with two of the serial ports 104, and the other parallel port 102 is paired up with the other two serial ports 104. For example, parallel port 102a can be paired with serial ports 104a and 104b. Likewise, the parallel port 102b can be paired with serial ports 104c and 104d. However, there is complete selectivity of the ports that are grouped together for dual unit operation. For example, parallel port 102a can be paired with either serial ports 104a and 104b, or serial ports 104c and 104d. In a backplane configuration, this provides flexibility to connect a parallel port to one or more serial ports for redundancy.

The transceiver 100 also includes a packet bit error rate tester (BERT) 112. The packet BERT 112 generates and processes packet test data that can be transmitted over any of the serial ports 104 or parallel ports 102 to perform bit error testing. Any type of packet data can be generated to perform the testing and at different data rates. For example, the packet BERT 112 can generate packet data that can be used to test the SERDES data link. As such, the packet BERT 112 provides a built-in self test for the SERDES data link. The packet BERT 112 generates test data that is sent over one or more of the serial ports 104 using the bus 106 to perform the bit error rate testing of the SERDES data link. Likewise, the packet BERT 112 can capture test data received over any one of the serial ports 104 or parallel ports 102 using the bus 106 for comparison with test data that was sent out. A bit error rate can then be determined based on this comparison.

In one embodiment, the packet BERT 112 is RAM-based so that the test data is stored and compared in a RAM memory to perform the bit error rate test. In another embodiment, the packet BERT 112 is logic-based so that the test data is generated by a logic function, and transmitted across a SERDES link. Upon receipt back, the test data is re-generated by the logic packet BERT 112, for comparison with the original test data that was sent over the SERDES data link. A RAM packet BERT 112 is more flexible than a logic packet BERT 112 because there is no limitation on the data that can be stored in the RAM packet BERT 112. However, a logic packet BERT 112 is more efficient in terms of substrate area because a RAM occupies more area than a logic circuit.

Since the packet BERT 112 shares the same bus 106 with the serial ports 104, the packet BERT 112 can monitor (or "snoop") between the serial ports 104. In other words, if data is being transmitted from one serial port 104 to another serial port 104, the packet BERT can capture and store a portion of this data for bit error testing. In one embodiment, the packet BERT 112 "blindly" captures data being sent from one serial port 104 to another serial port 104. In another embodiment, the packet BERT 112 starts capturing data after a particular byte of data is transmitted. In another embodiment, the packet BERT 112 starts capturing data after an error event occurs.

The SERDES transceiver chip 100 also includes the ability to include other optional logic blocks 114 that are not necessary for the operation of the SERDES transceiver. In other words, these could be customer-driven logic blocks or some other type of logic block. These optional logic blocks 114 can transmit and receive data over the serial ports 104 or parallel ports 102 using the bus 106. The packet BERT 112 and the optional blocks 114 connect to the bus 106 using the multiplexers 110.

The SERDES transceiver chip 100 also includes a management interface 116 that enables the configuration of the portions (parallel ports 102, serial port 104, packet BERT 112, and optional logic blocks 114) of the transceiver chip 100. In an embodiment, the management interface 116 is configured to be compatible with both IEEE 802.3™ clause 45 and the IEEE 802.3™ clause 22 management standards. The management interface 116 includes two pads 117 that enable two different management chips to program and control the portions of the transceiver chip 100. For example, one management chip connected to pad 117a could control the parallel port 102a and the serial ports 104a and 104b, and another management chip connected to pad 117b could control the parallel port 102b and the serial ports 104c and 104d. The quantity of pads 117 and management chips are provided for illustrative purposes. A greater or smaller quantity of pads 117 and management chips can be included as determined by the system designer.

Figure 2:
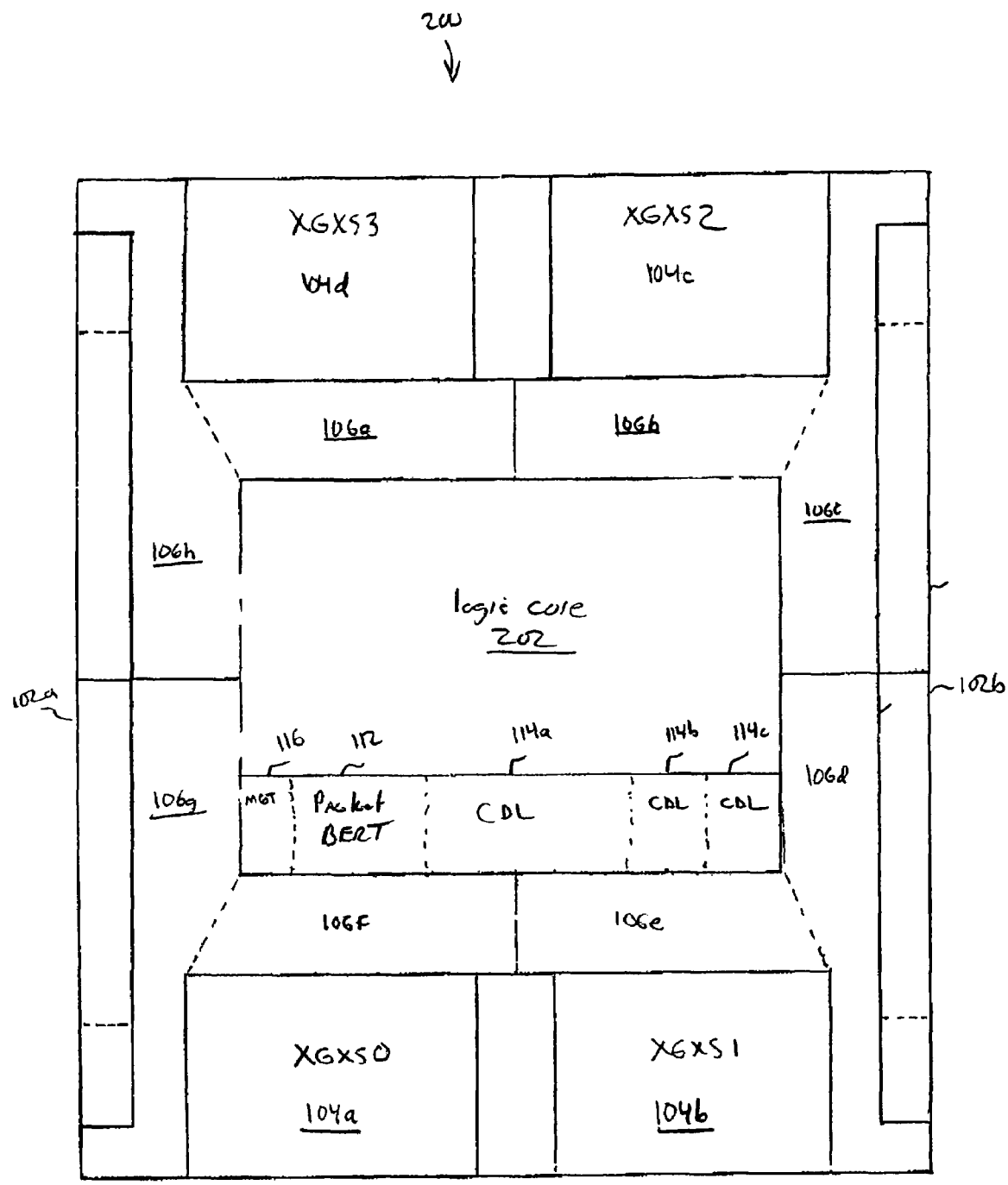
FIG. 2 illustrates a substrate layout of a multi-port SERDES transceiver chip according to an embodiment of the present invention.

FIG. 2 illustrates the substrate layout 200 for the SERDES transceiver 100 according to embodiments of the present invention. The substrate layout 200 is configured to minimize the substrate area of the transceiver 100, and efficiently provide the port interconnections described above.

The substrate layout 200 is configured so that the parallel ports 102a-102b and the serial ports 104a-104d are on the outer perimeter of the substrate layout 200, as shown. A logic core 202 is at the center of the substrate layout 200, where the logic core 202 operates the bus 106, serial ports 104, and parallel 102 ports. The management interface 116, the packet BERT 112, and the optional logic blocks 114a-114c are adjacent to the logic core 202 as shown. The bus 106 can be described as a "ring" structure (or donut "structure") around the logic core 202, and placed in between the logic core 202 and the parallel ports 102 and serial ports 104 that occupy the parameter of the substrate layout 200. Furthermore, the ring structure of the bus 106 also provides efficient communication between the logic core 202 and the various ports 102 and 104. Furthermore, the ring structure of the bus 106 also provides efficient communication between the management interface 116, the packet BERT 112, the optional logic blocks 114, and the various ports 102 and 104.

The bus 106 is illustrated as eight sections 106a-106g for ease of illustration. Each section provides an interface to the respective ports 102 or 104 that are adjacent to the respective sections.

Figure 3:
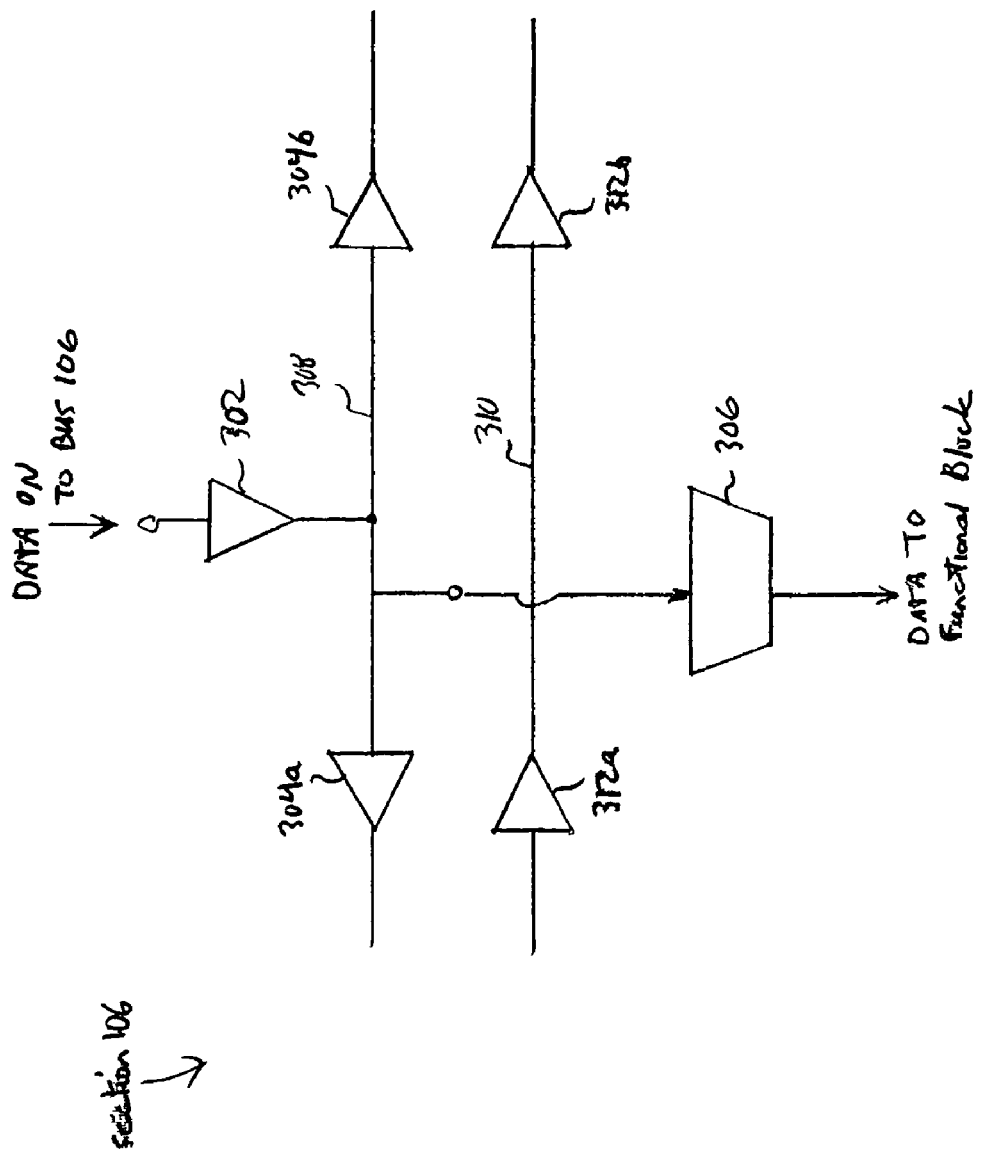
FIG. 3 illustrates sections of a bus on a multi-port SERDES transceiver chip according to an embodiment of the present invention.

FIG. 3 represents one of the eight sections 106a-106g of the bus 106 according to embodiments of the present invention. Each section of the bus 106 can be represented as two paths 308 and 310. Data enters the bus 106 through a buffer 302 and proceeds to its destination along the path 308 and through the buffers 304. Once on the bus 106, data passes from one section to another section of the bus 106 using the path 310 and passing through the buffers 312. The mux 306 represents data passing from the bus 106 to a functional block, such as a parallel port 102, serial port 104, or packet BERT 112. The actual wires and buffers on the bus 106 are matched to minimize signal distortion.

In embodiments, the data wires in the bus 106 are deposited on the substrate for substrate layout 200 in a particular fashion. Namely, a power or ground is placed between adjacent (or near by) data wires. Furthermore, adjacent data wires on the bus 106 are placed on two separate layers. Therefore, a power or ground will be above or below a data wire, and adjacent to a data wire. Therefore, two nearby data wires will not be located directly adjacent to one another, but instead will be positioned diagonally to each other, thereby reducing cross-talk.

Figure 4:
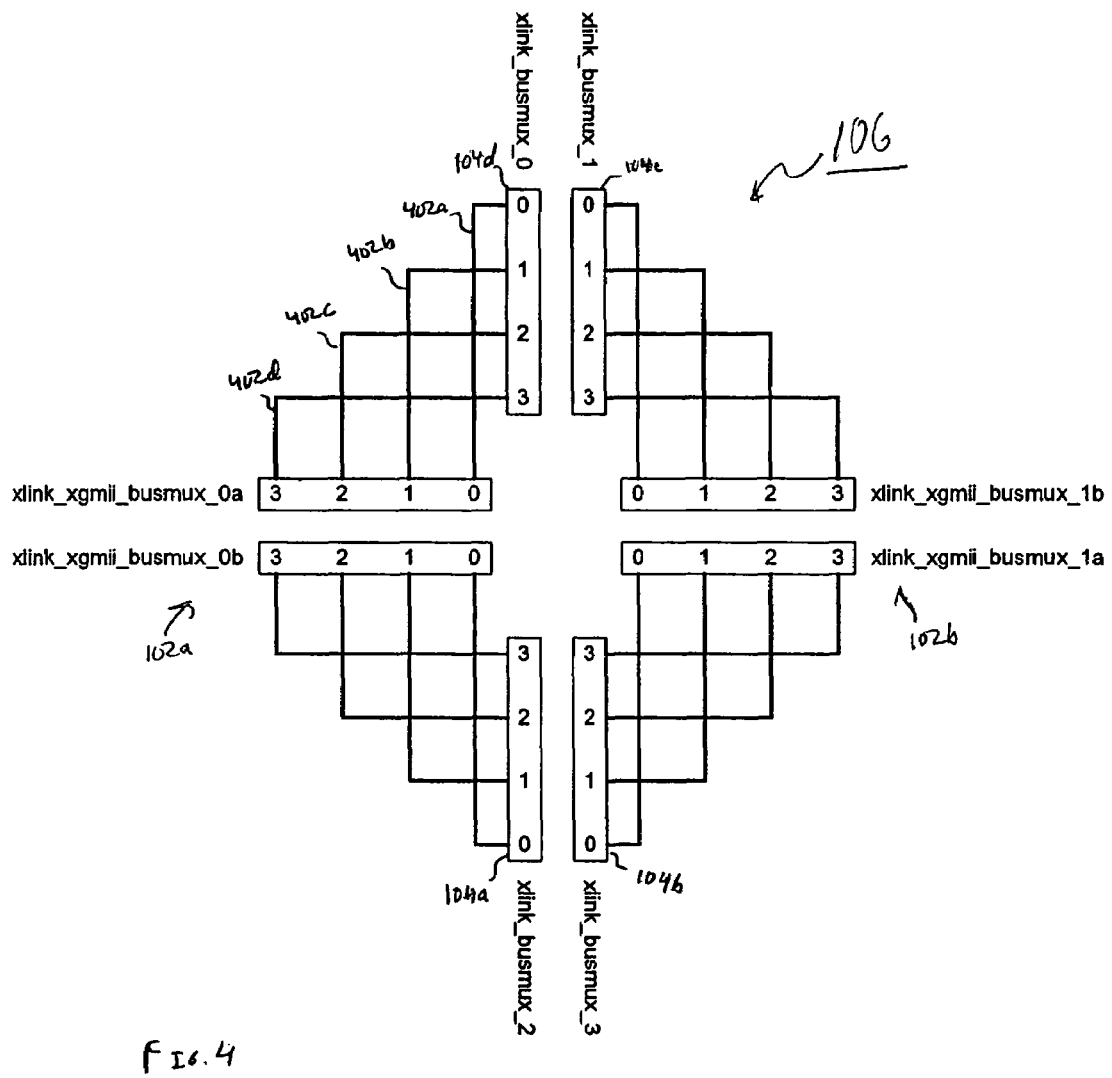
FIG. 4 illustrates path lengths of wires in a bus on a transceiver chip according to an embodiment of the present invention.

FIG. 4 further illustrates an example layout of the bus 106. The wires 402 between parallel ports 102 and serial ports 104 are configured to have the same path lengths. In other words, wires 402a-d are deposited so as to have the same path length so as to reduce signal distortion.

Figure 5:
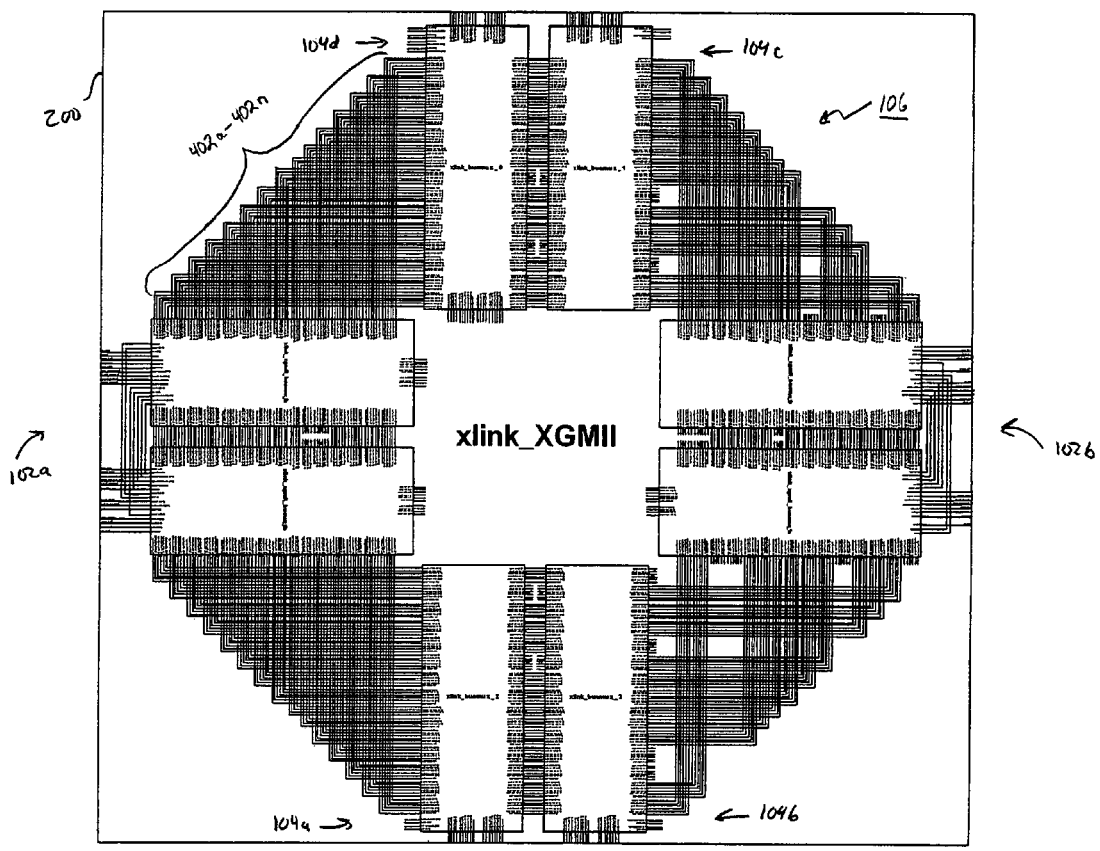
FIG. 5 illustrates path lengths of wires in a bus on a transceiver chip according to another embodiment of the present invention.

FIG. 5 illustrates another embodiment of the bus 106 in the substrate layout 200. Whereas FIG. 4 depicted only four wires 402a-402d for connecting one port (102 or 104) to an adjacent port (102 or 104), FIG. 5 depicts a plurality of wires 402a-402n for connecting two adjacent ports (102 and 104). The total number of wires 402a-402n is determined by the design of the chip 100.

In an embodiment, multi-port SERDES transceiver 100 is programmable to support different data protocols, including, but not limited to, the XGMII protocol, the Ten Bit Interface (TBI) protocol, the Reduced TBI (RTBI) protocol, and the like. Transceiver 100 is also programmable to support different electrical specifications, including, but not limited to, the High Speed Transistor Logic (HSTL) electrical specification, the Solid State Track Link (SSTL) electrical specification, the Low Voltage Transistor—Transistor Logic (LVTTL) electrical specification, and the like. The present invention includes methodologies or techniques for sending control signals to configure the parallel ports 102a-102b to support a designated data protocol. This can be explained with reference to FIG. 6, which illustrates a substrate layout 600 for the SERDES transceiver 100 according to another embodiment of the present invention. Substrate layout 600 includes a plurality of pads 604a-604d that are part of the four serial ports 104a-104d. In other words, each serial port 104 includes a plurality of pads 604. As shown, serial port 104a includes a plurality of pads 604a. Serial port 104b includes a plurality of pads 604b. Serial port 104c includes a plurality of pads 604c. Serial port 104d includes a plurality of pads 604d.

Substrate layout 600 also includes a plurality of pads 602a-602d representing two parallel ports 102a-102b. Pads 602a-602b are part of parallel port 102a, and pads 602c-602d are part of parallel port 102b. Pads 602a and pads 602d are input pads. As such, transceiver 100 receives data and control signals at input pads 602a and input pads 602d. Pads 602b and 602c are output pads that enable transceiver 100 to transmit data and control signals. In an embodiment, each group of pads 602 includes forty-four individual pads. Forty of the pads are dedicated to sending or receiving data signals, and four of the pads are dedicated to sending or receiving control signals (e.g., clock signals). The total quantity of pads can be increased or decreased as determined by the system designer. Likewise, the ratio of data-to-control pads can also be increased or decreased to meet system requirements as determined by the designer.

Substrate layout 600 also includes a plurality of management data input/output (MDIO) pads 606a-606d. MDIO pads 606a-606d represent another embodiment of pads 117a-117b, which are described above with reference to FIG. 1. MDIO pads 606a-606d are programmable to configure pads 602a-602d and 604a-604d for compliance with a designated electrical specification and/or data protocol. The electrical specification and/or data protocol is configured via an external pull-up or pull-down resistor(s) at the designated control pad. The electrical specifications include IEEE 802.3™ clause 45, IEEE 802.3™ clause 22, or the like. As shown, MDIO pads 606a control pads 602a-602b, MDIO pads 606b control pads 604c-604d, MDIO pads 606c control pads 602c-602d, and MDIO pads 606d control pads 604a-604b. As discussed above with reference to FIG. 1, in an embodiment, MDIO pads 606 receive instructions from one or more management chips. These instructions are executed by the MDIO pads 606 to configure transceiver 100 and parallel ports 102a-102b to be compatible with the designated electrical specification. As discussed, in an embodiment, one management chip is provided to instruct all MDIO pads 606 and their associated IO pads 602 and/or 604. In another embodiment, a distinct management chip is provided to instruct each MDIO pad 606 and its associated IO pads 602 and/or 604. In another embodiment, a separate management chip is provided to instruct a subset of MDIO pads 606 and their associated IO pads 602 and/or 604.

The serial IO pads 604a-604d, parallel IO pads 602a-602d, and MDIO pads 606a-606d are positioned to provide rotational symmetry for substrate layout 600. Therefore, if the transceiver 100 is rotated 180 degrees, the serial and parallel ports can be connected to another communications device without impeding the performance of transceiver 100, or having to reconfigure either device. The symmetrical layout of the components also allows efficiencies to be gained when the transceiver is being connected. For instance, while wire-bonding the pads (i.e., 604a-604d, 602a-602d, and 606a-606d), a technician only needs to design or configure equipment to wire-bond half of the transceiver 100 since the other half would have identical dimensions.

Figure 7:
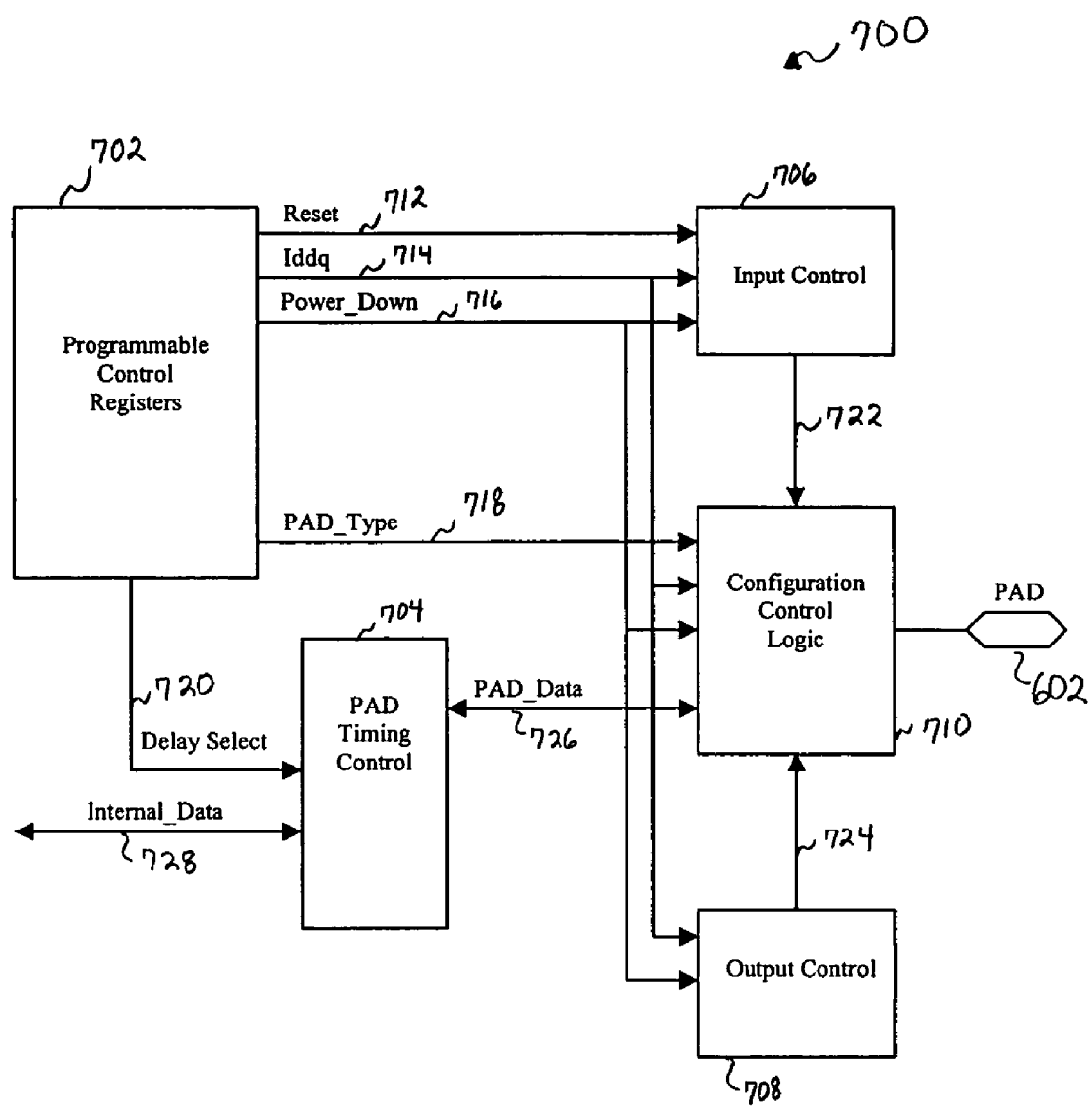
FIG. 7 illustrates a control system for programming a transceiver pad according to an embodiment of the present invention.

As discussed, the pads 602a-602d for the parallel ports 102a-102b are programmable to support multiple different standards, protocols, and/or functions. FIG. 7 illustrates a block diagram for logic or circuitry for a control system 700 for programming each pad 602 according to an embodiment of the present invention. Control system 700 includes one or more programmable control registers 702, a pad timing controller 704, input controller 706, output controller 708, and configuration control logic 710. Configuration control logic 710 is responsive to various control signals, which are executed to program pad 602 such that it is capable of supporting a designated protocol. Input controller 706 sends an input control signal 722 to configuration control logic 710 to program pad 602 to receive input. Output controller 708 sends an output control signal 724 to configuration control logic 710 to program pad 602 to send output.

Control registers 702 includes five types of control signals for programming pad 602. A system operator inputs these control signals, but in an embodiment, the control signals are supplied by a computer system (not shown). The five control signals include a reset message 712, an Iddq message 714, a power down message 716, a pad type message 718, and a delay select message 720.

A reset message 712 is released to instruct pad 602 to change its originally designated function (i.e., input or output). For example, if pad 602 is originally designated as an output pad, the pad 602 is reconfigured to operate as an input pad upon receipt of a reset message 712. In FIG. 7, pad 602 is an output pad. Therefore, reset message 712 is only delivered to input controller 706 to enable pad 602 to switch to receiving input.

An Iddq message 714 is released to implement Iddq testing to measure the quiescent supply current of transceiver 100. When executed, Iddq message 714 places the path across a pad 602 in a quiescent state to measure the leakage current. As shown, Iddq message 714 is sent to input controller 706, output controller 708, and/or configuration control logic 710 for implementation.

A power down message 714 is released to suspend the operations of portions of pad 602. If power down message 714 is delivered to input controller 706, pad 602 no longer receives input. If power down message is delivered to output controller 708, pad 602 no longer outputs data or control messages. If power down message 714 is delivered to configuration control logic 710, the muxing and timing operations of the control logic 710 are suspended.

PAD type message 718 specifies the data protocol and electrical specification, and instructs configuration control logic 710 to implement the specified data protocol and electrical specification. As discussed, the data protocol includes the XGMII, TBI, RTBI protocols, and the like. The electrical specification includes HSTL, SSTL, and LVTTL electrical specifications, and the like.

Delay select message 720 specifies the path delay for input and output. The parameter specified in the delay select message 720 enables the system operator, or the like, to adjust the delay between input and output at each pad 602 for better system performance.

Figure 10:
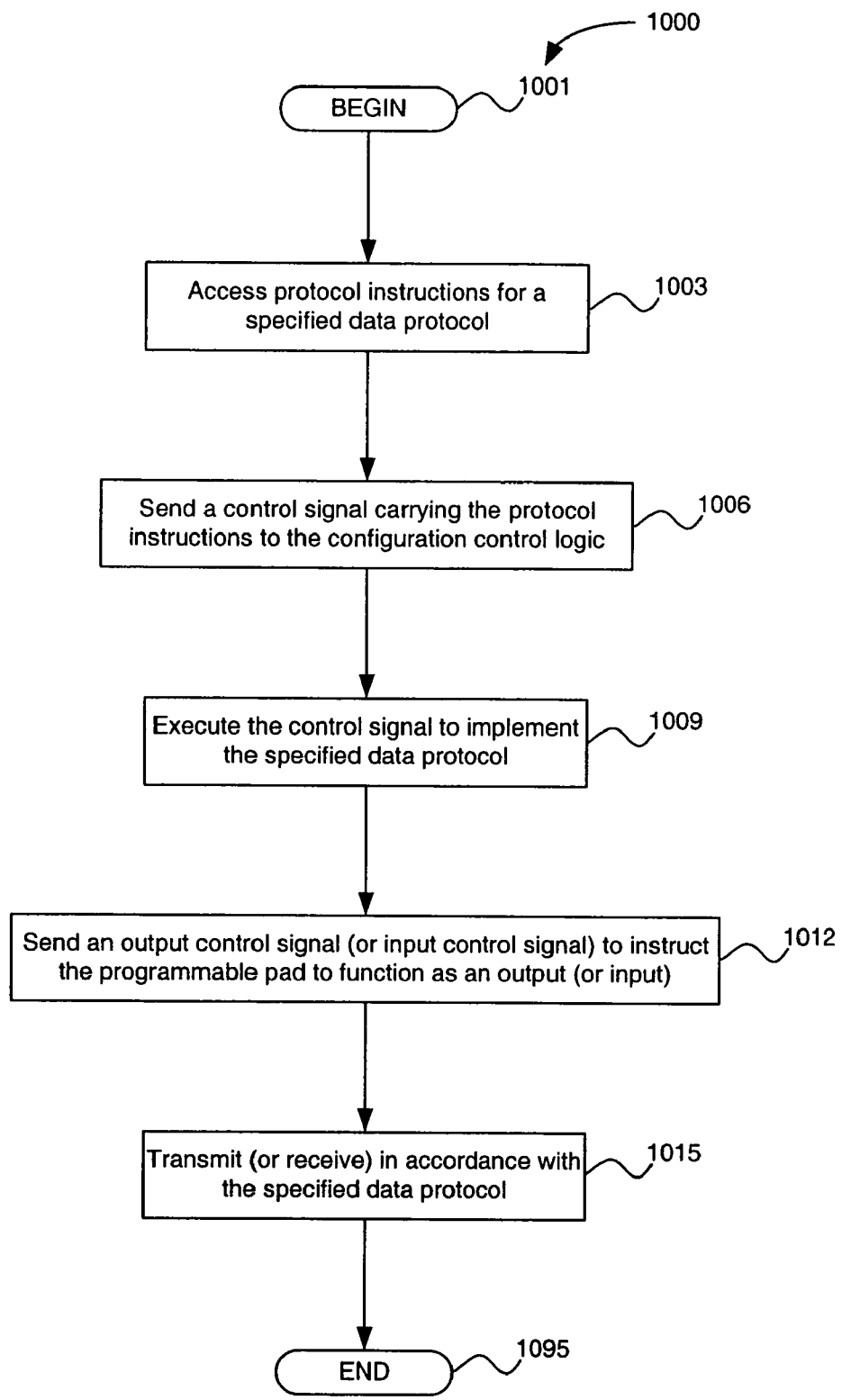
FIG. 10 illustrates an operational flow for configuring a transceiver pad to support a specified data protocol according to an embodiment of the present invention.

As discussed above, the present invention allows transceiver 100 to be programmed to support different data protocols. Referring to FIG. 10, flowchart 1000 represents the general operational flow for configuring a programmable pad 602 to support a designated data protocol, according to an embodiment of the present invention.

The control flow of flowchart 1000 begins at step 1001 and passes immediately to step 1003. At step 1003, protocol instructions for a designated data protocol are specified. Referring back to FIG. 7, the specified protocol instructions are placed in programmable control registers 702.

At step 1006, a control signal carrying the protocol instructions are released to program a pad 602. Referring back to FIG. 7, the control signal is shown as PAD type message 718, which is received by configuration control logic 710.

At step 1009, the control signal (i.e., PAD type message 718) is executed to implement the specified data protocol. At step 1012, an output control signal 724 or input control signal 722 is sent to configuration control logic 710 to instruct the programmable pad 602 to function as an output or input. At step 1015, pad 602 transmits or receives in accordance with the specified data protocol. Afterwards, the control flow ends as indicated at step 1095.

Figure 11:
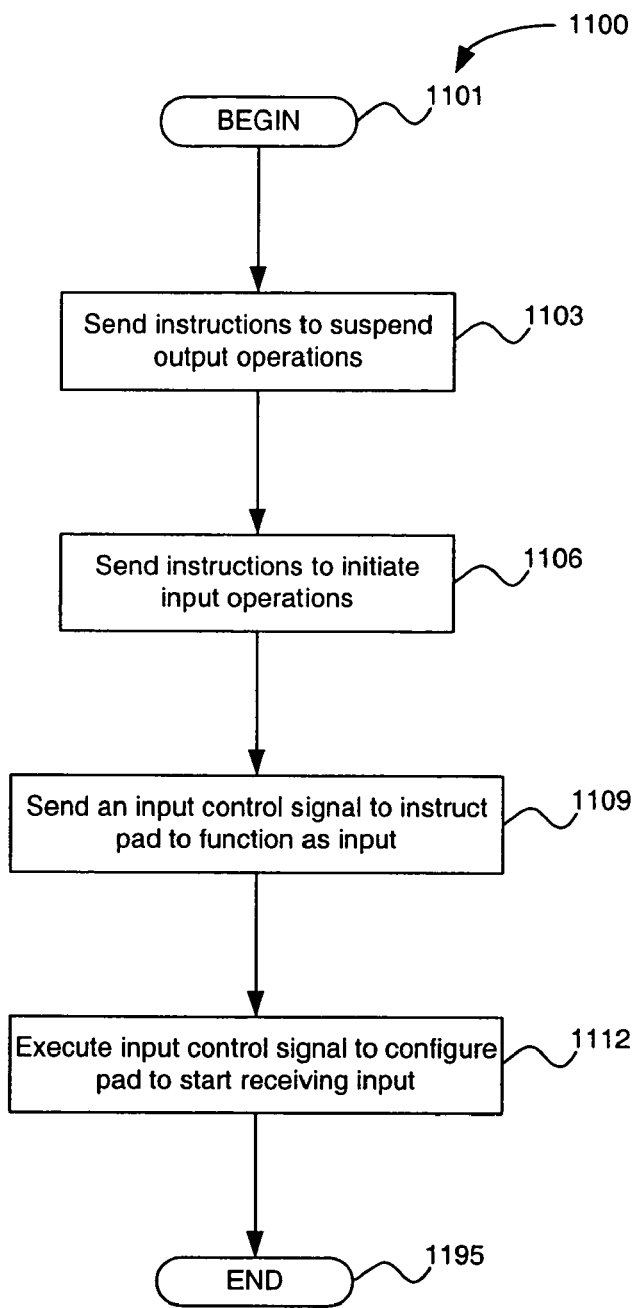
FIG. 11 illustrates an operational flow for reconfiguring an output transceiver pad to function as an input according to an embodiment of the present invention.

Referring back to FIG. 7, pad 602 is programmed to function as an output. However, pad 602 can be reconfigured to function as an input. Referring to FIG. 11, flowchart 1100 provides an example of a general operational flow for reconfiguring an output programmable pad 602 to function as an input.

The control flow of flowchart 1100 begins at step 1101 and passes immediately to step 1103. At step 1103, pad 602 is instructed to cease functioning as an output. Referring back to FIG. 7, power down message 716 is sent to output controller 708, which as a result, stops sending output control signal 724.

At step 1106, input operations are initiated at pad 602. Referring back to FIG. 7, reset message 712 is sent to input controller 706 to initiate the operations. At step 1109, input control signal 722 is sent to configuration control logic 710. At step 1112, configuration control logic 710 executes the input control signal 722 to configure pad 602 to start receiving input. Afterwards, the control flow ends as indicated at step 1195.

Figure 12:
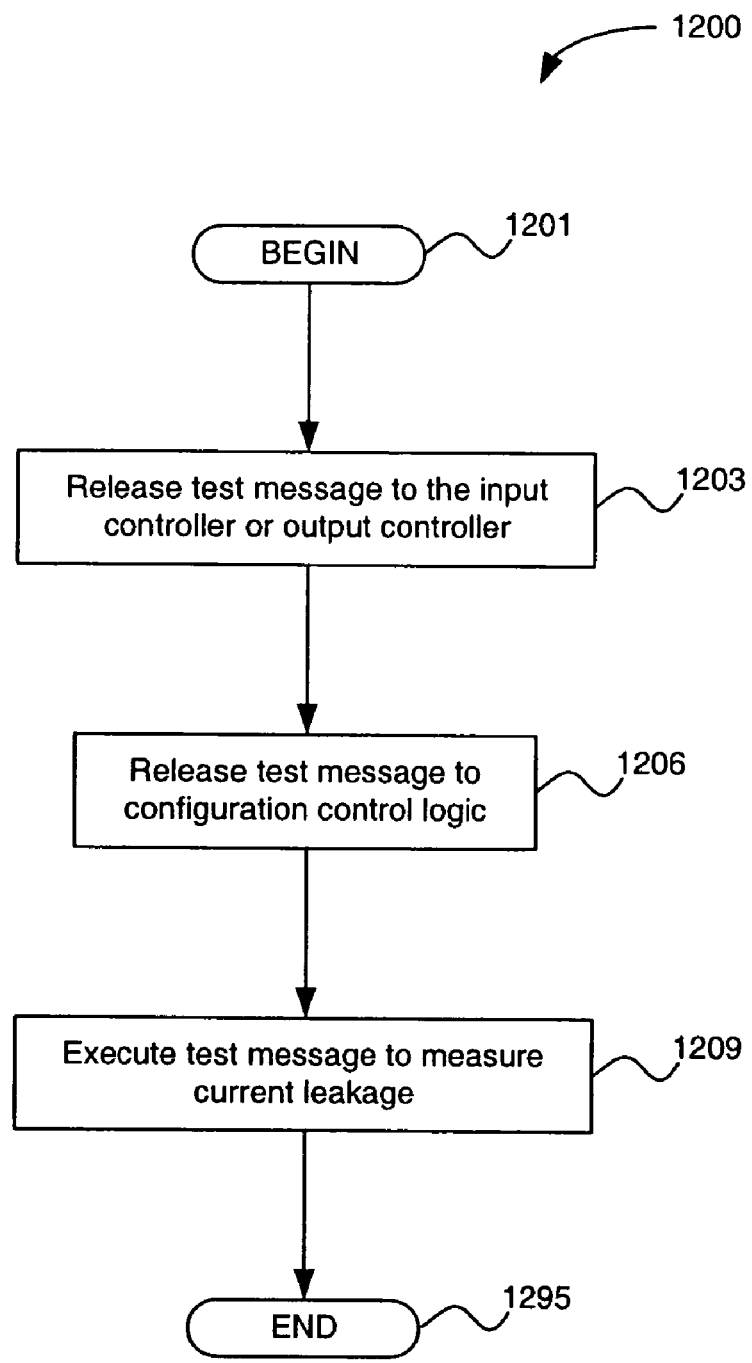
FIG. 12 illustrates an operational flow for programming a transceiver pad to perform Iddq testing according to an embodiment of the present invention.

As discussed above, programmable control registers 702 also release an Iddq message 714 to implement Iddq testing. Referring to FIG. 12, flowchart 1200 provides an example of a general operational flow for programming pad 602 to perform Iddq testing.

The control flow of flowchart 1200 begins at step 1201 and passes immediately to step 1203. At step 1203, Iddq message 714 is released to either input controller 706 or output controller 708, depending on the I/O operations currently designated for pad 602. At step 1206, Iddq message 714 is also released to configuration control logic 710, which programs pad 602 to measure leakage as previously discussed. Afterwards, the control flow ends as indicated at step 1295.

As shown, if pad 602 is operating as an input pad, pad timing controller 704 receives pad data 726 from pad 602. The delay select message 720 instructs pad timing controller 704 to buffer the pad data 726 for a prescribed time period before sending the data to its destination as internal data 728. The prescribed time period is substantially the same as the path delay at other pads 602.

Conversely, if pad 602 is operating as an output pad, pad timing controller 704 receives internal data 728 and buffers the data for a prescribed time period before enabling it to be output as pad data 726.

Figure 8:
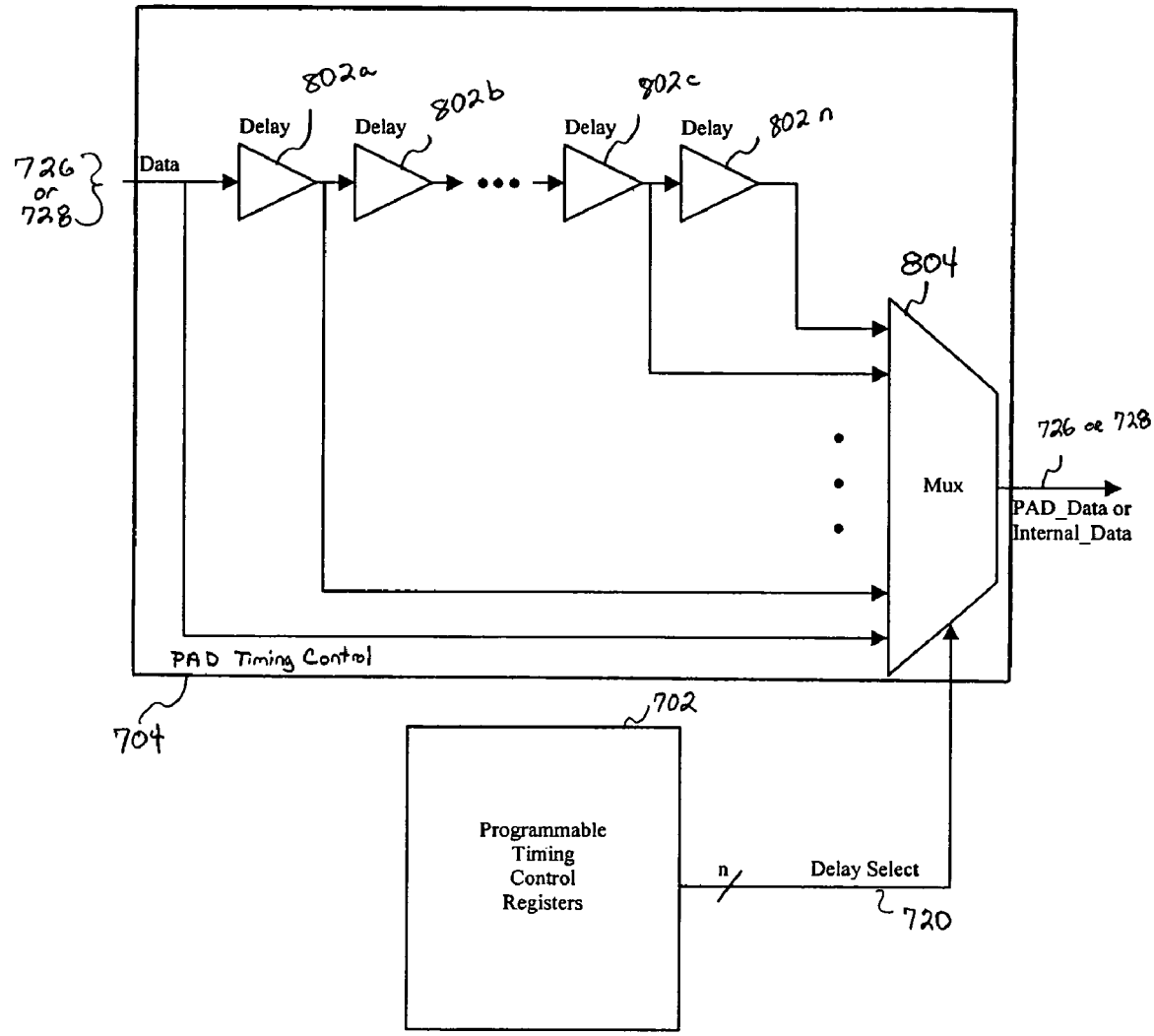
FIG. 8 illustrates a pad timing controller according to an embodiment of the present invention.

FIG. 8 represents the buffering process for implementing path delay according to an embodiment of the present invention. As shown, pad timing controller 704 includes a plurality of buffers 802a-802n and a multiplexer 804. Data enters pad timing controller 704 and is delayed in one or more buffers 802a-802n for a prescribed time period. The incoming data can be pad data 726 received by pad 602, or internal data 728 received from another portion of transceiver 100.

Each buffer 802a-802n delays the incoming data a fixed delay time. The delay time is fixed internally. In other words, the system designer specifies the delay time for the buffers during fabrication of transceiver 100, and this value is not changed by the control registers 702 or a system operator. The data is sent to the next buffer 802a-802n unless multiplexer 804 opens the communications path to receive the data. The delay select message 720 determines when multiplexer 804 opens the communications path. The communications path can be opened prior to the data entering one of the buffers 802a-802n, or at any point after the data is released from one of the buffers 802a-802n. Therefore, the delay select message 720 enables the path delay to be increased or decreased by specifying the number of buffers 802a-802n, if any, that the data should traverse. Once the data is received by multiplexer 804, the data is sent to its destination as pad data 726 or internal data 728.

Figure 13:
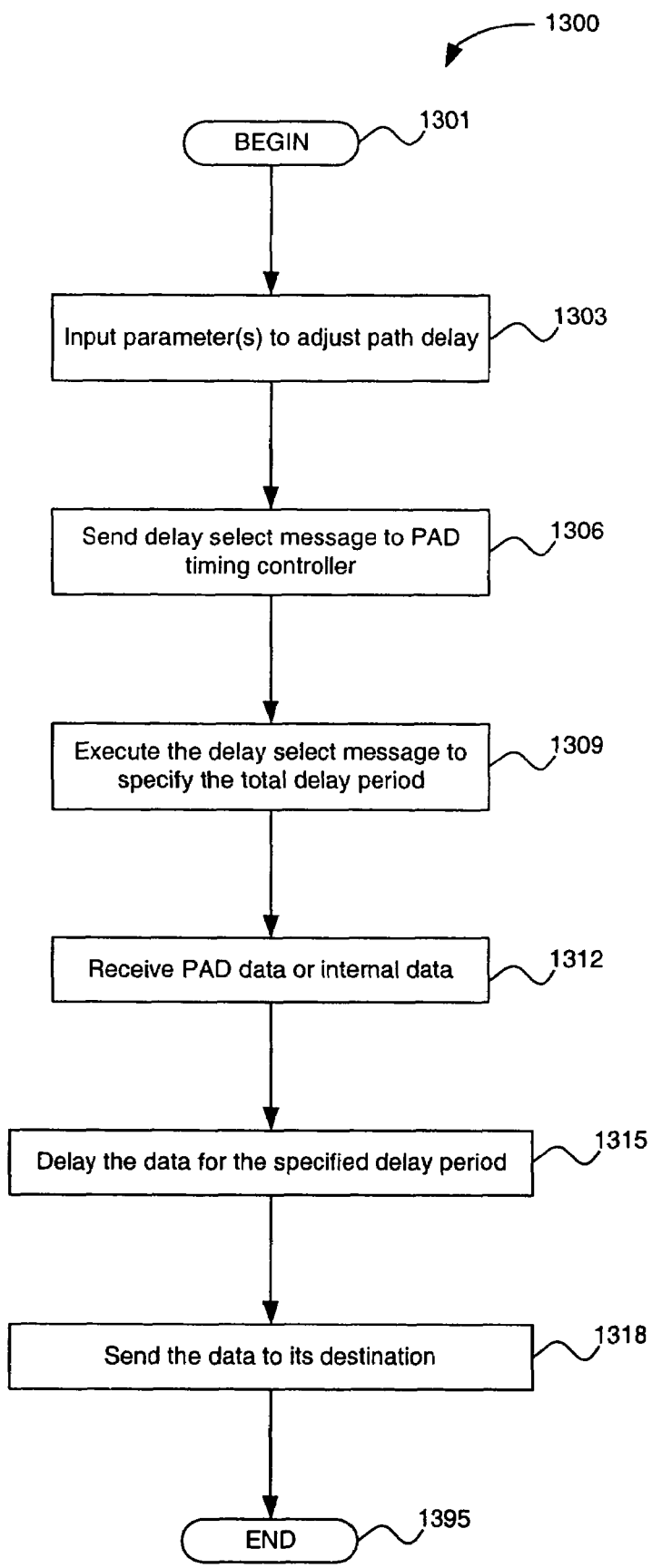
FIG. 13 illustrates an operational flow for changing a timing protocol for a transceiver pad according to an embodiment of the present invention.

Hence, the multi-port SERDES transceiver 100 includes the ability to change the timing of parallel ports 102 and serial ports 104. This includes the ability to change the timing between the data and clock signals. In other words, the registers in the parallel ports 102 and serial ports 104 can be re-programmed to operate at different timing protocols. Referring to FIG. 13, flowchart 1300 provides an example of a general operational flow for changing the timing protocol for a pad 602.

The control flow of flowchart 1300 begins at step 1301 and passes immediately to step 1303. At step 1303, one or more parameters are input to adjust the path delay. Referring back to FIG. 7, the parameters are entered at programmable control registers 702.

At step 1306, the delay parameters are communicated to PAD timing controller 704. Referring back to FIG. 7, the delay parameters are encoded in delay select message 720.

At step 1309, the delay parameters (i.e., delay select message 720) are executed to specify the total delay period for the path delay. As discussed with reference to FIG. 8, the total delay period is measured by the quantity of buffers 802a-802n that data must traverse before being received by multiplexer 804.

At step 1312, data (i.e., PAD data 726 or internal data 728) is received, and at step 1315, the data is delayed the specified total delay period. At step 1318, the data is sent to its destination. Afterwards, the control flow ends as indicated at step 1395.

Figure 6:
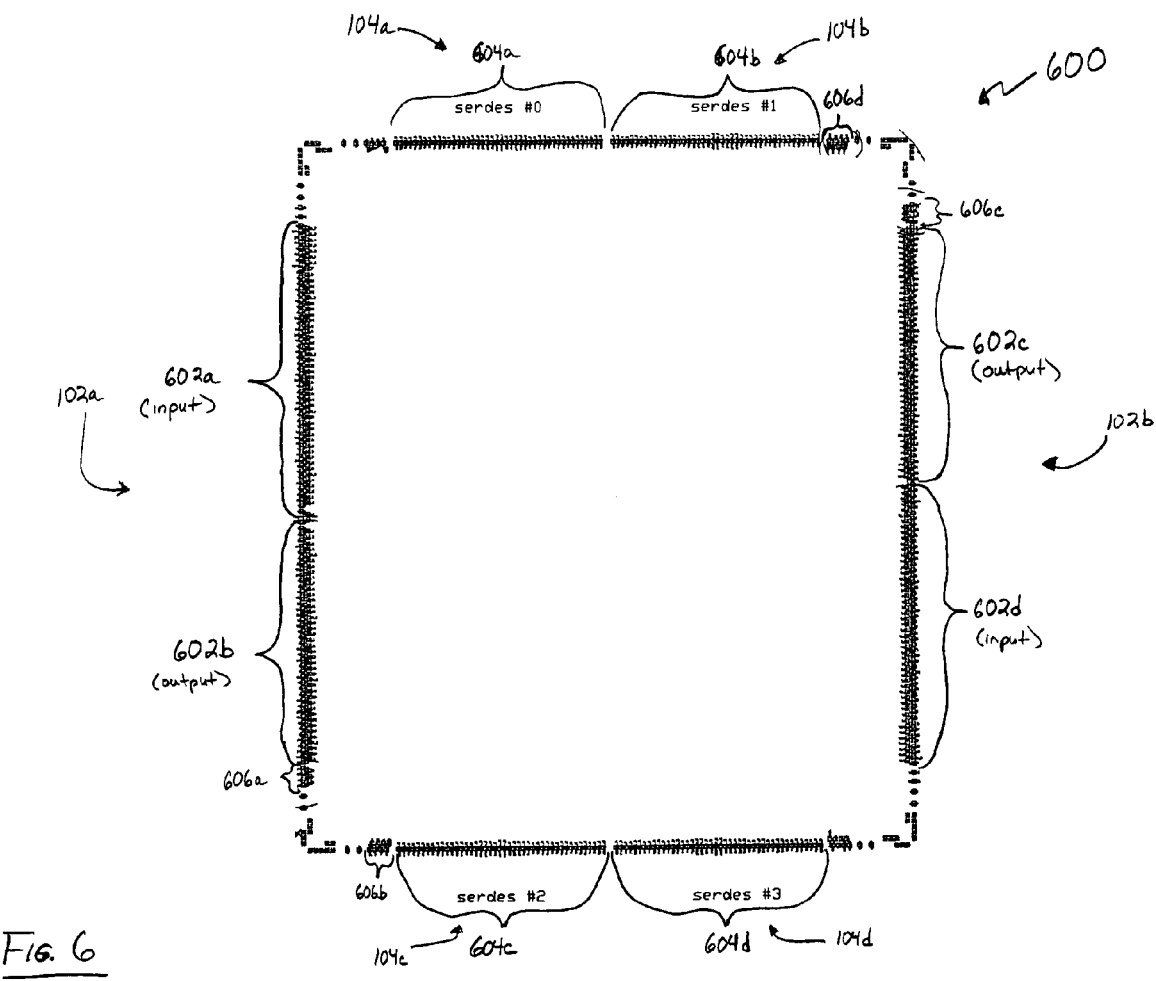
FIG. 6 illustrates a substrate layout of the multi-port SERDES transceiver chip according to another embodiment of the present invention.

As discussed with reference to FIG. 6, each MDIO pad 606a-606d is programmable to configure itself to comply with a designated electrical standard, such as IEEE 802.3™ clause 22, IEEE 802.3™ clause 45, or the like. For instance, IEEE 802.3™ clause 22 specifies the access to management scheme, including data protocol and electrical requirements.

Pads 602a-602d are programmable to support any combination of data protocols (e.g., XGMII, TBI, RTBI, etc.) and electrical specifications (e.g., HSTL, SSTL, LVTTL, etc.), and the electrical requirements are determined by the designated electrical specification. For example, the SSTL electrical specification requires pads 602a-602d to operate at 2.5 volts. The HSTL electrical specification requires pads 602a-602d to operate at 1.5 volts or 1.8 volts. The LVTTL electrical specification requires pads 602a-602d to operate at 2.5 volts or 3.3 volts.

Notwithstanding the electrical requirements for pads 602a-602d, MDIO pads 606a-606d must operate at 1.2 volts to comply with IEEE 802.3™ clause 45. To comply with IEEE 802.3™ clause 22, MDIO pads 606a-606d must operate at 2.5 volts. Accordingly, MDIO pads 606a-606d are programmable to configure themselves and their associated pads 602a-602d to comply with the appropriate electrical requirements. For example, to comply with IEEE 802.3™ clause 45, the power connection to the MDIO pads (e.g., pads 606c) and their corresponding input and output pads (e.g., 602d and 602c) must be broken to allow the MDIO pads to operate at 1.2 volts and the input/output pads to operate at 2.5 volts. To enable the split voltage requirement to be implemented, a split-voltage bus structure is provided to connect the pads for transceiver 100 to a bus. An embodiment of a split-voltage bus structure is illustrated in FIG. 9.

Figure 9:
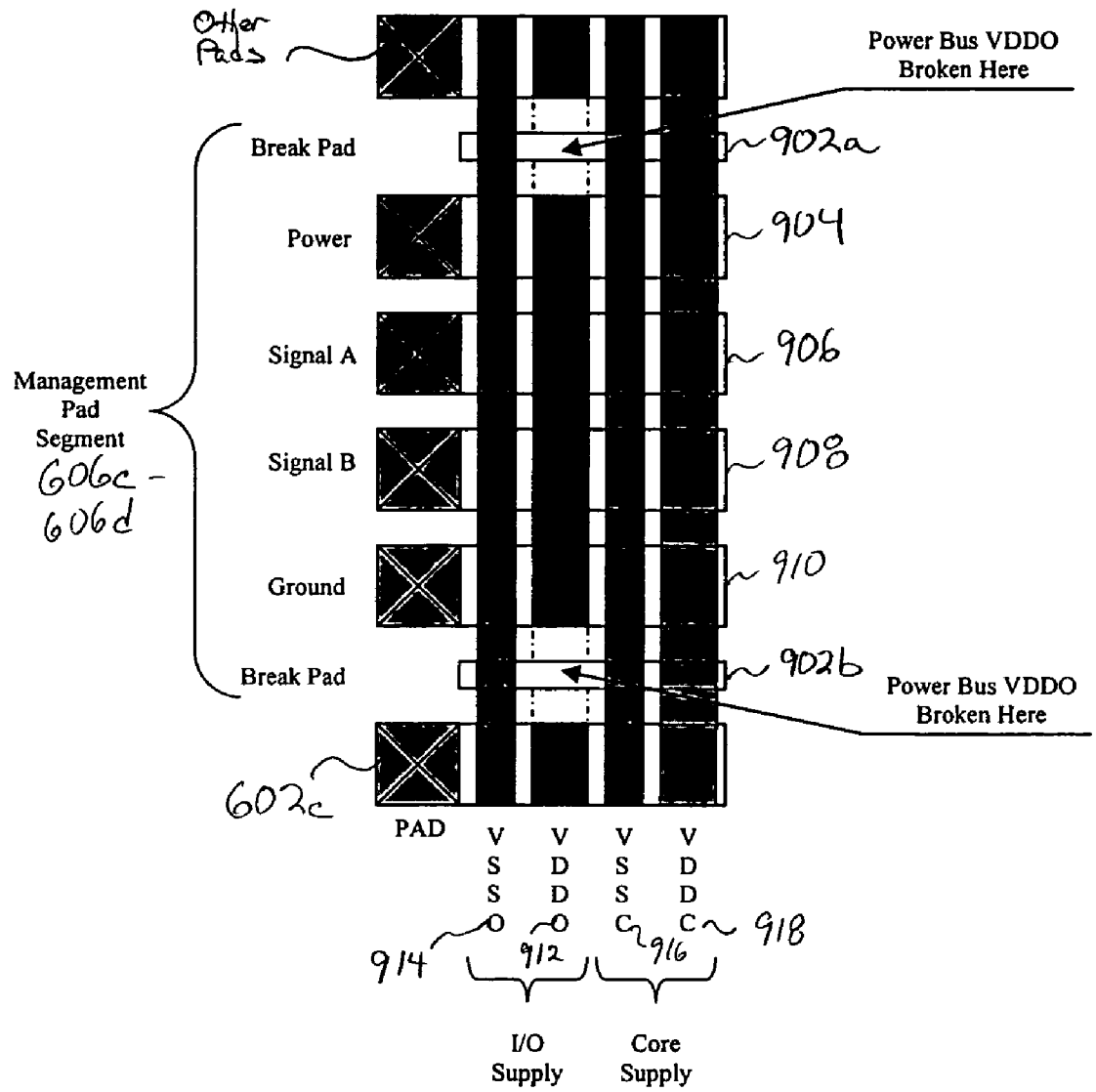
FIG. 9 illustrates a power bus connection for a multi-port SERDES transceiver chip according to an embodiment of the present invention.

FIG. 9 illustrates power supply connections for MDIO pads 606c-606d and output pads 602c, according to an embodiment of the present invention. The power supply connections include VDDO I/O supply 912, VSSO I/O supply 914, VSSC core supply 916, and VDDC core supply 918. MDIO pads 606c-606d are separated from output pads 602c by split voltage structure 902a-902b. Structure 902a-902b breaks the power bus VDDO I/O supply 912, which allows different electrical requirements to be provided for MDIO pads 606c-606d and the adjacent output pads 602c. Hence, the power signals 904, data signals 906, clock signals 908, and ground signals 910 for MDIO pads 606c-606d will not interfere with the electrical and data signals communicated from output pads 602c. The connection for the VSSO I/O supply 914, VSSC core supply 916, and VDDC core supply 918 is not broken by the structure 902a-902b.

Figure 14:
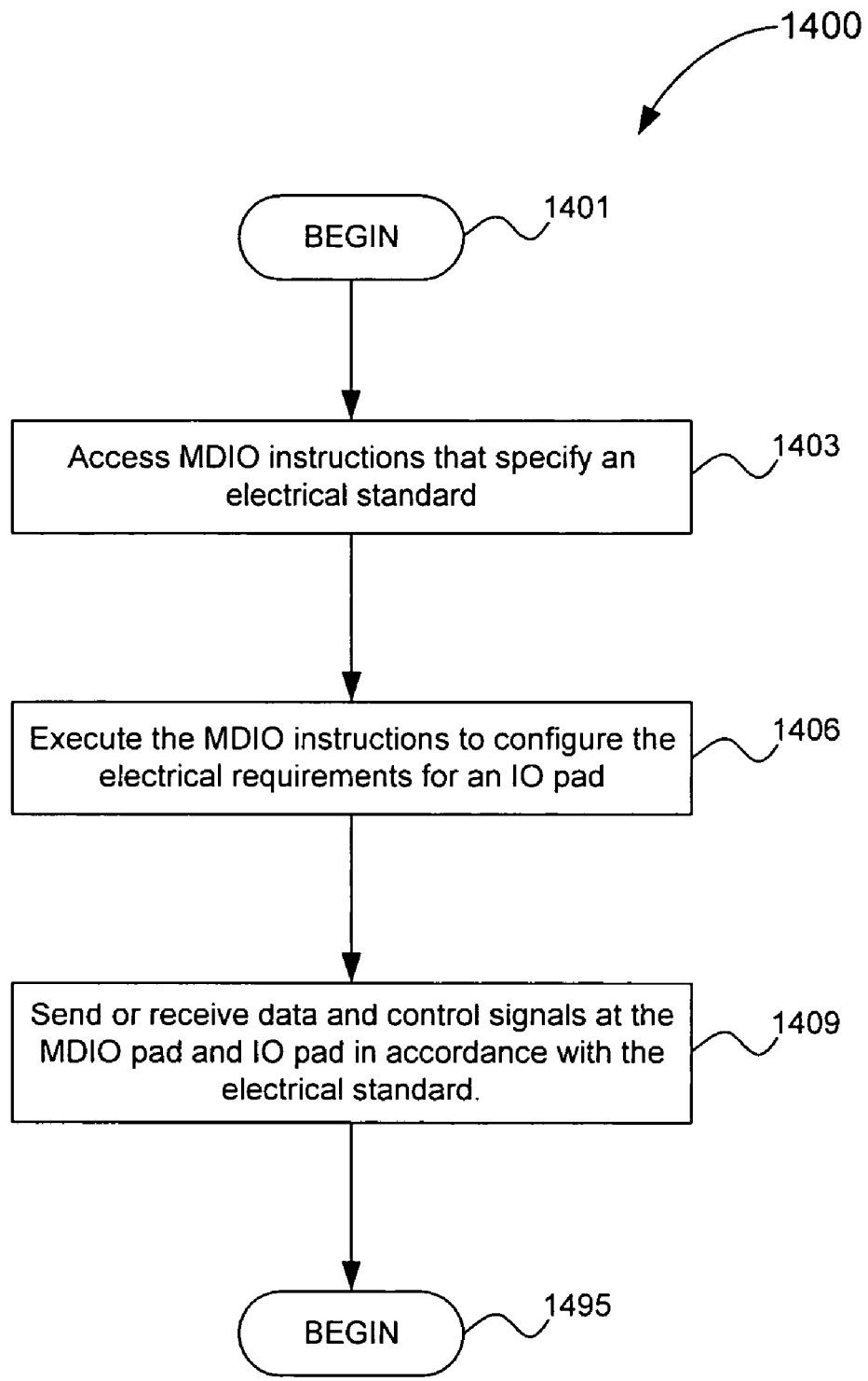
FIG. 14 illustrates an operational flow for configuring a transceiver pad to comply with a specified electrical specification according to an embodiment of the present invention.

Referring to FIG. 14, flowchart 1400 provides an example of a general operational flow for configuring a programmable pad (i.e., serial IO pads 604a-604d, parallel IO pads 602a-602d, and MDIO pads 606a-606d) to comply with a specified electrical standard, such as IEEE 802.3™ clause 22, IEEE 802.3™ clause 45, or the like.

The control flow of flowchart 1400 begins at step 1401 and passes immediately to step 1403. At step 1403, MDIO instructions are accessed to identify the specified electrical specification (e.g., HHTL, SSTL, LVTTL, etc.). As discussed, the MDIO pad 606 must operate at a certain voltage, depending on the specified electrical specification.

At step 1406, the MDIO instructions are executed to configure the electrical requirements for the associated IO pads 602 and/or 604. As discussed, the IO pads 602 and/or 604 may be required to operate at a different voltage than the MDIO pad 606.

Once the electrical requirements have been configured, the control passes to step 1409. At step 1409, data and control signals are sent or received at the MDIO pad 606 and IO pads 602 and/or 604 in accordance with the specified electrical specification. Afterwards, the control flow ends as indicated at step 1495.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A transceiver, comprising:
   a plurality of pads, wherein at least one of said plurality of pads is a programmable IO pad capable of supporting at least two data protocols and at least two electrical specifications, wherein at least one of said plurality of pads is a programmable MDIO pad capable of supporting at least two data protocols and at least two electrical specifications; and
   a plurality of ports in communications with said plurality of pads, wherein one of said plurality of ports is a parallel port in communications with said programmable IO pad.

2. The transceiver of claim 1, wherein said data protocols and electrical specifications comprise the standards specified in IEEE 802.3™ clause 45 and IEEE 802.3™ clause 22.

3. The transceiver of claim 1, wherein said data protocols include at least two of XGMII, TBI, RTBI data protocols, wherein said electrical specifications include at least two of HSTL, SSTL, and LVTTL electrical specifications.

4. The transceiver of claim 1, further comprise:
   a bus structure for separating a power connection of said programmable MDIO pad from a power connection of said programmable IO pad.

5. The transceiver of claim 4, wherein said power connection of said programmable MDIO pad operates at a first voltage and said power connection of said programmable IO pad operates at a second voltage, wherein said first voltage differs from said second voltage.

6. The transceiver of claim 4, wherein said power connection of said programmable MDIO pad operates at 1.2 volts or 2.5 volts, and said power connection of said programmable IO pad operates at 2.5 volts or 3.3 volts.

7. The transceiver of claim 1, wherein said programmable IO pad is programmable to operate as an input or an output.

8. The transceiver of claim 1, wherein said programmable IO pad is programmable to receive or send one of a data signal or a clock signal.

9. The transceiver of claim 1, wherein one at least of said plurality of ports is a serial port in communications with said programmable IO pad.

10. The transceiver of claim 9, wherein said serial port is XAUI.

11. The transceiver of claim 9, further comprising a bus connecting said parallel port to said serial port on a common substrate with said plurality of ports.

12. The transceiver of claim 11, wherein said bus is configured to have a ring shape.

13. The transceiver of claim 11, wherein said bus is configured to have a ring shape around a logic core.

14. The transceiver of claim 11, further comprising a packet bit error rate tester (BERT) connected to said bus, said packet BERT able to determine bit error rates of at least one of said parallel port and said serial port.

15. The transceiver of claim 1, wherein the plurality of pads and the plurality of ports are formed on a chip.

* * * * *